(12) United States Patent
Bestwick et al.

(10) Patent No.: US 8,567,066 B2
(45) Date of Patent: Oct. 29, 2013

(54) AIRCRAFT RIB-SPAR JOINT

(75) Inventors: Richard Bestwick, Penyffordd (GB); Scott Grant, Mossley Hill (GB)

(73) Assignee: Airbus Operations Limited, Bristol (GB)

( * ) Notice: Subject to any disclaimer, the term of this patent is extended or adjusted under 35 U.S.C. 154(b) by 215 days.

(21) Appl. No.: 13/238,468

(22) Filed: Sep. 21, 2011

(65) Prior Publication Data

US 2012/0073137 A1 Mar. 29, 2012

(30) Foreign Application Priority Data

Sep. 28, 2010 (GB) .................................. 1016278.2

(51) Int. Cl.
 *B21D 53/88* (2006.01)
(52) U.S. Cl.
 USPC ........ 29/897.2; 29/281.5; 29/407.1; 408/72 R
(58) Field of Classification Search
 USPC ............. 29/897, 897.2, 281.1, 281.5, 407.09, 29/407.1; 408/72 R, 115 R
 See application file for complete search history.

(56) References Cited

U.S. PATENT DOCUMENTS

| | | | |
|---|---|---|---|
| 6,796,014 B2 * | 9/2004 | Sarh | 29/407.09 |
| 7,578,044 B2 * | 8/2009 | Clark | 29/525.02 |
| 2007/0102578 A1 | 5/2007 | Clark | |

FOREIGN PATENT DOCUMENTS

| | | |
|---|---|---|
| EP | 0485027 A2 | 5/1992 |
| EP | 0888201 A1 | 1/1999 |
| GB | 2312483 A | 10/1997 |
| WO | 97-34733 A1 | 9/1997 |

OTHER PUBLICATIONS

British Search Report for GB-1016278.2 dated Jan. 13, 2011.

* cited by examiner

*Primary Examiner* — David Bryant
*Assistant Examiner* — Ryan J Walters
(74) *Attorney, Agent, or Firm* — Lowe Hauptman & Ham, LLP

(57) ABSTRACT

A method of forming a rib-spar joint during assembly of an aircraft wing, the method comprising: providing a spar with a fixedly attached rib post, the rib post having a first coordination feature; providing a rib having a web with a first tooling feature; providing a tooling component having a second tooling feature for cooperating with the first tooling feature, a second coordination feature for cooperating with the first coordination feature, and a plurality of drill bushings; fixedly attaching the tooling component to the rib web by aligning the first and second tooling features; aligning the rib with the spar by aligning the first and second coordination features; drilling fastener holes in the rib and the rib post off the drill bushings of the tooling component; removing the tooling component from the rib web; and fastening the rib to the rib post using the fastener holes to form a rib-spar joint. The method may be applied to form front and/or rear rib-spar joints.

15 Claims, 5 Drawing Sheets

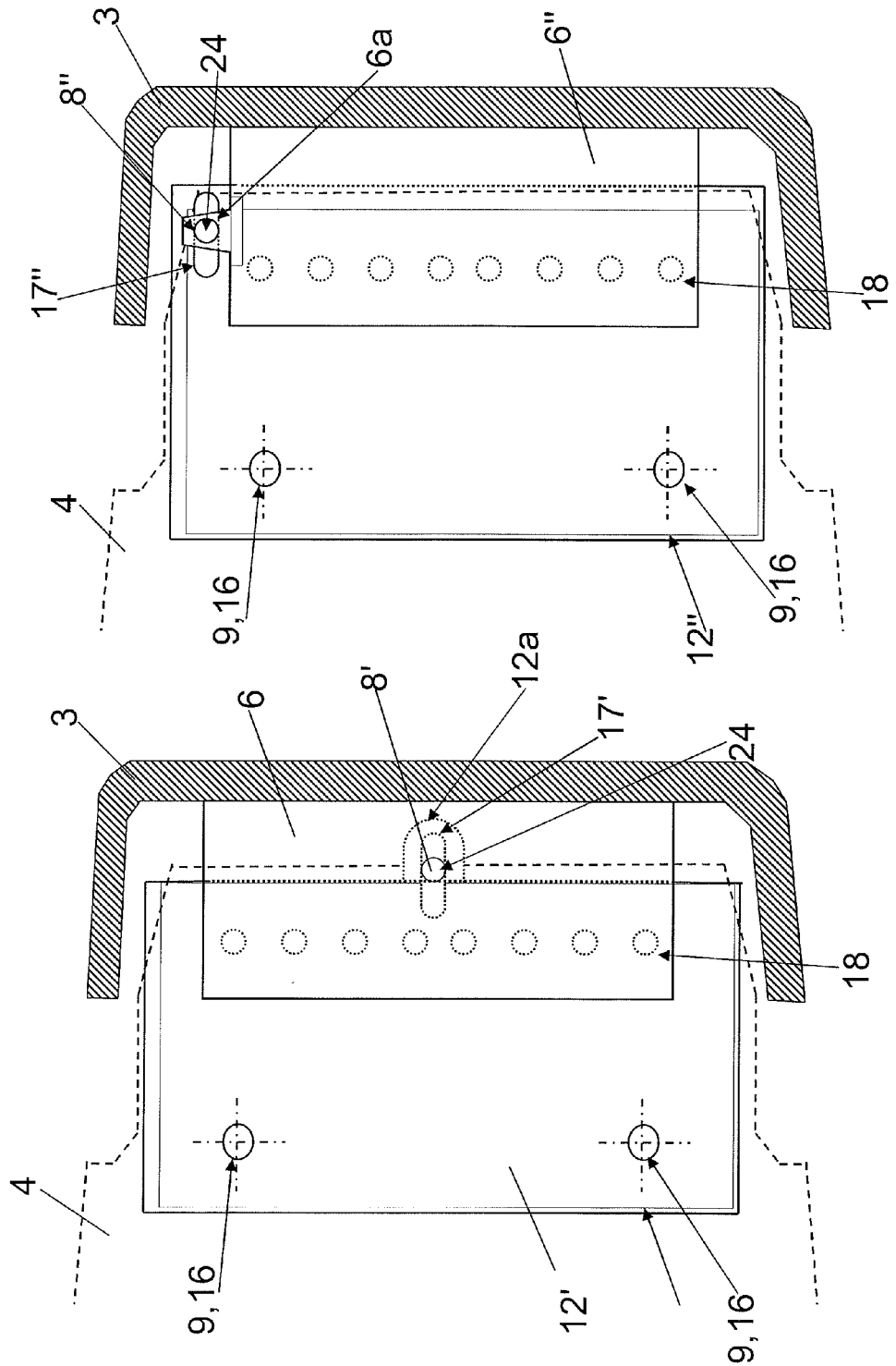

AIRCRAFT RIB-SPAR JOINT

RELATED APPLICATIONS

The present application is based on, and claims priority from, British Application Number 1016278.2, filed Sep. 28, 2010, the disclosure of which is hereby incorporated by reference herein in its entirety.

FIELD OF THE INVENTION

The present invention relates to a method of forming a rib-spar joint during assembly of an aircraft wing.

BACKGROUND OF THE INVENTION

Aircraft wings typically include front and rear spars, ribs extending between the spars, and upper and lower covers (skins) extending between the spars. The outer surfaces of the covers form part of the aerodynamic wing profile. The spars, ribs and covers are assembled to form a wing box structure.

An existing method for forming rib-spar joints between the ribs and the spars during assembly of the wing includes manually installing the ribs and adjusting their position based on gap measurements taken with feeler gauges to the adjacent spar structure using tooling gauges placed at the four corners of each rib component. This method has several drawbacks. As it was a manual process, it was subject to operator error. The assembly process was time consuming often requiring several checking and adjusting cycles to achieve the optimum position. Each rib required a set of eight unique gauges, resulting in a large amount of tooling.

In addition, with the move from traditional metallic to composite materials, e.g. carbon fibre reinforced plastic (CFRP), for at least some of the wing box structural components, the tolerances have increased adding more complexity and variation to the assembly process.

Furthermore, whereas aircraft wings have traditionally been assembled in a vertical orientation (i.e. ribs upright), there are advantages in assembling the wing in a horizontal orientation (i.e. level flight orientation). However, manual manipulation of the structural wing components during assembly is made more difficult with this horizontal orientation due to the influence of gravity.

SUMMARY OF THE INVENTION

A first aspect of the invention provides a method of forming a rib-spar joint during assembly of an aircraft wing, the method comprising: providing a spar with a fixedly attached rib post, the rib post having a first coordination feature; providing a rib having a web with a first tooling feature; providing a tooling component having a second tooling feature for cooperating with the first tooling feature, a second coordination feature for cooperating with the first coordination feature, and a plurality of drill bushings; fixedly attaching the tooling component to the rib web by aligning the first and second tooling features; aligning the rib with the spar by aligning the first and second coordination features; drilling fastener holes in the rib and the rib post off the drill bushings of the tooling component; removing the tooling component from the rib web; and fastening the rib to the rib post using the fastener holes to form a rib-spar joint.

The invention is advantageous in that the coordination and tooling features are formed in the spar (rib post) and rib components respectively prior to assembly, such that during assembly alignment of the coordination features using minimal reusable tooling sets the rib and spar components relative to one another. The method is a "part-to-part" philosophy. The coordination and tooling features can be positioned to a high degree of accuracy prior to assembly, and operator error can be minimised during assembly, such that the completed wing assembly meets the required aerodynamic profile. This is a significant improvement over the "best fit" approach traditionally employed, especially where composite materials are used. The assembly operation can be completed far quicker than before since no manipulation of the components is required, which reduces the assembly time and increases productivity.

The tooling features may be holes for receiving tooling pins (e.g. bolts or other removable tooling fasteners), and the step of attaching the tooling component to the rib web may include using the aligned tooling holes. The first tooling feature(s) may form a datum structure of the rib to which the rib geometry is machined to. The tooling features can be positioned to a high degree of accuracy. Since the first tooling feature remains in the finished assembly, it is beneficial that the tooling features are substantially circular holes for good fatigue performance.

The coordination features may be holes for receiving a locating pin, and the alignment step may include passing a locating pin through the aligned coordination features. The locating pin may have appropriate, accurately defined, dimensions for fitting inside the hole with minimal, or zero, play in one or more directions. This ensures that the rib and spar components can be accurately aligned. The hole may be substantially circular, or formed as an elongate slot. In the case of an elongate slot, the locating pin may have minimal, or zero, play in one direction.

The drill bushings of the tooling component may be arranged linearly. This helps improve load transfer through the completed rib-spar joint.

The second coordination feature may be offset from the line of drill bushings. Since the first and second coordination features are aligned prior to drilling the fastener holes off the drill bushings, this offset ensures that the first coordination feature does not significantly impact on load transfer through the completed rib-spar joint.

The step of aligning the rib with the spar may include bringing opposing surfaces of the rib post and the rib web together.

The method may further comprise clamping the rib web and the rib post between the tooling component and a backing component after alignment of the rib with the spar and prior to drilling the fastener holes. The backing component may be another piece of reusable tooling and may be used to ensure even pressure across the joint during drilling. The backing component may have tooling features for aligning with the tooling features of the tooling component.

The tooling component may have two second tooling features, one set to a higher dimensional tolerance than the other. The higher tolerance second tooling feature may be aligned with a cooperating first tooling feature before the lower tolerance second tooling feature. This can improve alignment when attaching the tooling component to the rib web.

The method may further comprise providing a spacer component between the tooling component and the rib web. The spacer component may be used to provide a region for swarf collection during the drilling step, so as to avoid damage to the rib web.

A further aspect of the invention provides a method of assembling an aircraft wing, comprising forming a front rib-spar joint between a front spar and a rib according to the method of the first aspect, and forming a rear rib-spar joint between the rib and a rear spar according to the method of the first aspect.

The rib web may have a third coordination feature adjacent the front spar for cooperating with the first and second coordination features. The rib web may have no coordination feature adjacent the rear spar. Providing the third coordination feature at only one end of the rib web provides for management of assembly tolerance. In some circumstances, where assembly tolerance can be otherwise managed, it may be desirable to include coordination features at both ends of the rib web.

The cooperating first to third coordination features for forming the front rib-spar joint may be each substantially identical substantially circular holes, and the step of aligning the rib with the front spar may include positioning a locating pin in the aligned holes.

The first coordination feature on the rear rib post may be a substantially circular hole, and the second coordination feature on the rear tooling component may be a chord-wise elongate slot, and the step of aligning the rib with the rear spar may include positioning a locating pin in the slot aligned with the hole.

The assembly method may be repeated to join a plurality of ribs between the front and rear spars with rib-spar joints.

The aircraft wing may be assembled with the rib longitudinal axis being substantially horizontal (i.e. level flight orientation). A horizontal orientation may improve operator safety and enable assembly in height restricted buildings. However, the invention may also be applicable to a wing assembly in a vertical orientation (i.e. rib longitudinal axis being substantially vertical).

BRIEF DESCRIPTION OF THE DRAWINGS

Embodiments of the invention will now be described with reference to the accompanying drawings, in which:

FIG. 3 illustrates a first alternative tooling arrangement for assembling the wing box; and FIG. 4 illustrates a second alternative tooling arrangement for assembling the wing box.

DETAILED DESCRIPTION OF EMBODIMENT(S)

Figure 1:
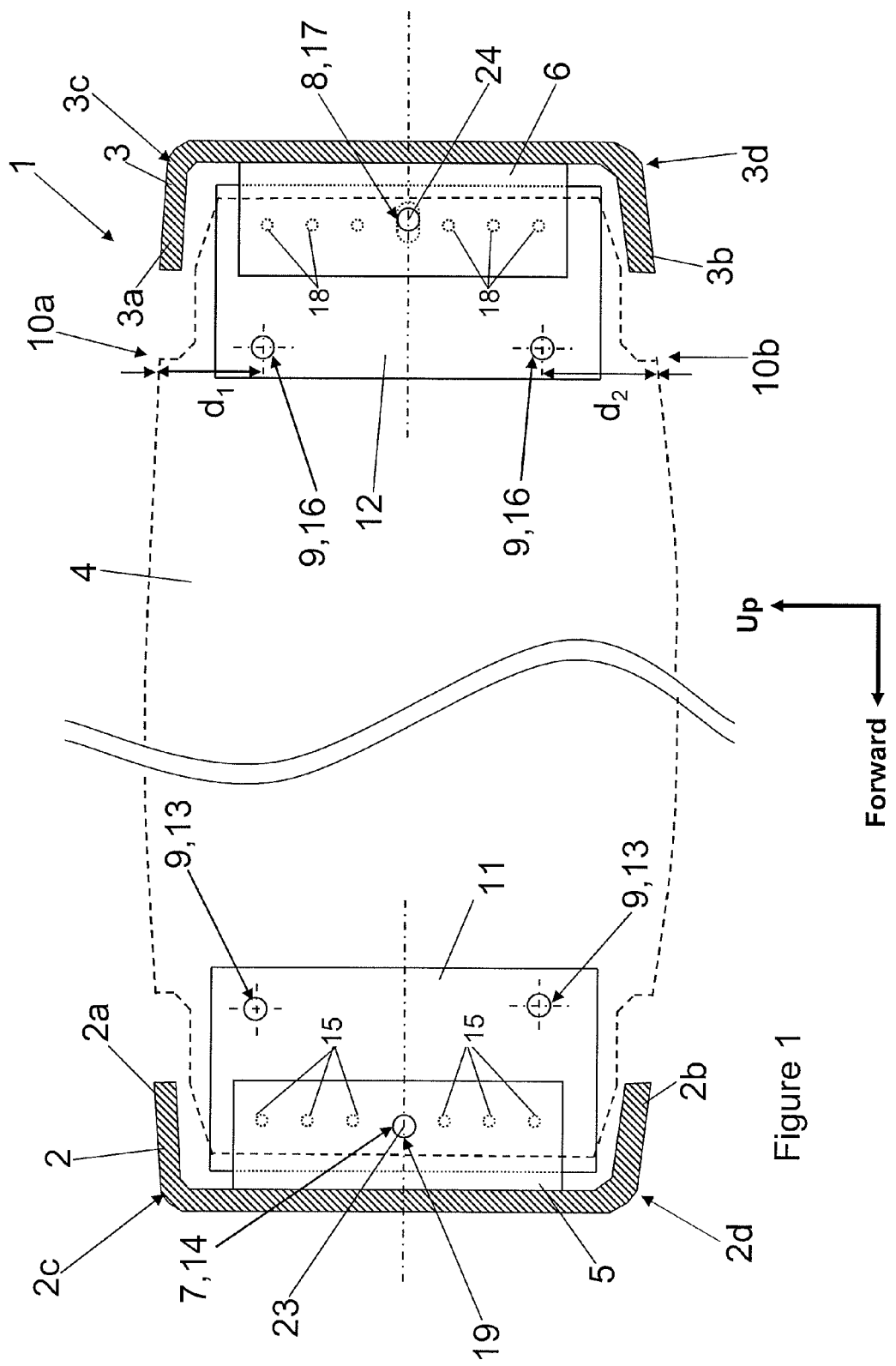
FIG. 1 illustrates a vertical section view through an aircraft wing box during assembly.

FIG. 1 illustrates a vertical section through an aircraft wing box 1 during assembly. The wing box includes a front spar 2 a rear spar 3 a plurality of ribs (the outline of one of the ribs 4 is shown in broken line in FIG. 1) extending between the spars 2, 3, and upper and lower wing covers, or skins (not shown), extending between the spars 2, 3. The front spar 2 has a rib post 5 fixedly attached thereto, and the rear spar 3 has a rib post 6 fixedly attached thereto. The wing box is assembled by attaching each of the plurality of ribs 4 to respective rib posts 5, 6 attached at spaced locations along the front and rear spars 2, 3. Subsequently, upper and lower wing covers (not shown) are attached to spar flanges 2a, 2b, 3a, 3b and to rib feet (not shown) of the ribs 4.

The attachment of the rib 4 to the rib posts 5, 6 will now be described in detail. The front and rear spars 2, 3 are fixed in predetermined positions relative to one another. This may be done using an appropriate jig, for example. The rib posts 5, 6 are fixedly attached to their respective spars 2, 3 prior to positioning the spars 2, 3 in the correct orientation. The front rib post 5 includes a first coordination feature, in this instance a circular through hole 7, which has been accurately pre-drilled relative to heel points 2c, 2d of the front spar 2. In this example, the through hole 7 in the rib post 5 is centrally located between the spar heel points 2c, 2d, and a predetermined distance from the front spar 2, although the hole 7 could be nearer the top or the bottom of the joint, provided it is positioned relative to heel points 2c and 2d to acceptable tolerance. Alternatively, should the spar girth tolerances be controlled to an acceptable and known level, the coordination hole 7 in the front rib post 5 can be set relative to the upper heel point 2c only.

The rear rib post 6 also has a first coordination feature, which in this case is also a circular through hole 8, which has been accurately pre-drilled relative to heel points 3c, 3d of the rear spar 3. In this example, the through hole 8 in the rib post 6 is centrally located between the spar heel points 3c, 3d, and a predetermined distance from the rear spar 3.

The rib 4 has a pair of first tooling features towards the front of the rib and a pair of first tooling features towards the rear of the rib 4. In this example, the first tooling features each comprise a through hole 9 in the web of the rib 4. The first tooling features 9 in the web of the rib 4 have been accurately pre-drilled in the rib component prior to assembly. The four tooling holes 9 in the rib 4 define a datum structure to which all features of the rib 4 have been machined to. For example, rear toe points 10a, 10b on the rib component 4 are dimensioned from respective ones of the rear tooling holes 9 by an offset distance d1 or d2.

A front tooling component 11 is used to correctly align the rib 4 with the front rib post 5, and a rear tooling component 12 is used to align the rib 4 with the rear rib post 6. The front tooling component 11 includes a pair of second tooling features 13 for cooperating with the front pair of first tooling features 9 of the rib 4. Therefore, in this example the second tooling features 13 are circular through holes in the front tooling component 11 of a similar diameter to the circular through holes 9. The relative orientation of the second tooling features 13 is identical to the relative orientation of the first tooling features 9.

The front tooling component 11 further includes a second coordination feature 14 for cooperating with the first coordination feature 7 of the front rib post 5. Therefore, in this example, the second coordination feature 14 is a circular through hole of identical diameter to the first coordination feature 7. The relative positioning of the second coordination feature 14 to the second tooling features 13 is such that when the front tooling component 11 is attached to the rib 4 using the first and second tooling features 9, 13, and the first and second coordination features 7, 14 are brought into alignment, the rib 4 will be in the correct orientation and position with respect to the front spar 2.

The front tooling component 11 further includes a plurality of drill bushings 15 used for drilling off fastener holes in the rib 4 and the front rib post 5 once the rib 4 has been aligned with the front spar 2. The drill bushings 15 are arranged substantially vertically and linearly.

The rear tooling component 12 includes a pair of second tooling features 16 for cooperating with the rear pair of first tooling features 9 of the rib 4. Therefore, in this example, the second tooling features 16 are circular through holes of similar diameter to the circular through holes of the first tooling features 9. The relative orientation of the second tooling features 16 is identical to the relative orientation of the first tooling features 9.

With the first tooling features 9 in the rib 4, the upper ones of each pair of tooling holes are master holes that form a datum structure and all other features, including the lower tooling holes, are machined relative to the upper tooling holes. The hole diameters of the second tooling features 13, 16 in the front and rear tooling components 11, 12 are slightly different to those of the first tooling features 9 to allow fitting of tooling pins (as described below) and build up of tolerances.

The rear tooling component 12 further comprises a second coordination feature 17 for cooperating with the first coordination feature 8 of the rear rib post 6. The second coordination feature 17 is an elongate slot having a height substantially the same as the diameter of the first coordination feature 8 but being elongate in the wing box chordwise direction. The relative positioning of the second coordination feature 17 to the second tooling features 16 is such that when the rear tooling component 12 is attached to the rib 4 using the first and second tooling features 9, 16, and the first and second coordination features 8, 14 are brought into alignment, the rib 4 will be in the correct orientation and vertical position with respect to the rear spar 3.

The rear tooling component 12 further includes a plurality of drill bushings 18 for drilling off fastener holes in the rib 4 and the rear rib post 6 once the rib 4 has been aligned with the rear spar 3. The drill bushings 18 are arranged substantially vertically and linearly.

In addition to the first tooling features 9 the web of the rib component 4 further includes a front (third) coordination feature 19 for cooperating with the first and second coordination features 7, 14 of the front rib post 5 and the front tooling component 11, respectively. Therefore, the front coordination feature 19 is a circular through hole of similar diameter to the circular through holes of the first and second coordination features 7, 14. The rib component 4 has no similar coordination feature adjacent the rear rib post 6.

Figure 2:
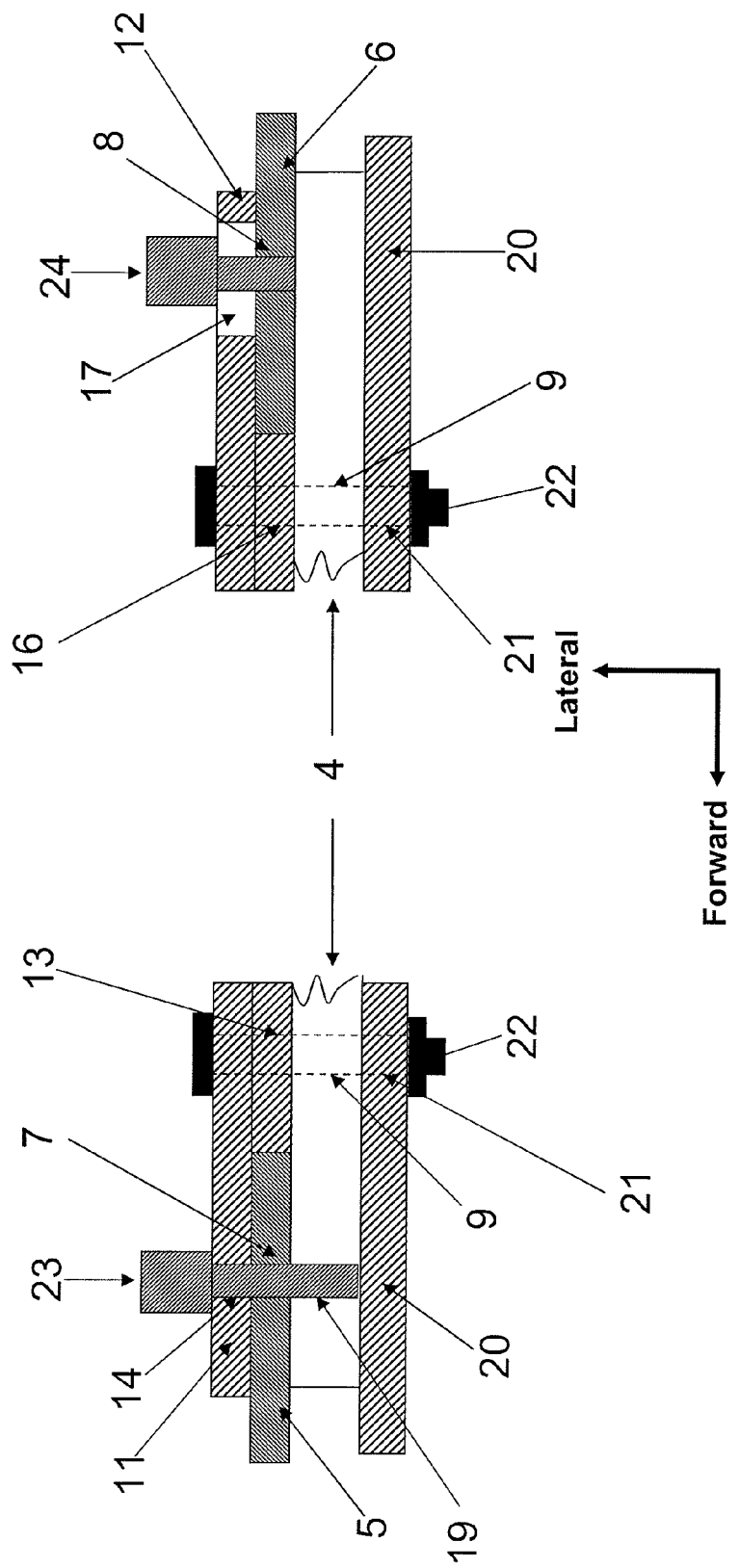
FIG. 2 illustrates a horizontal section view along the centreline of the aircraft wing box during assembly.

FIG. 2 illustrates a horizontal section view through the aircraft wing box 1 during assembly. A method of assembling the aircraft wing box 1 will now be described with reference to FIGS. 1 and 2.

First, the front and rear tooling components 11, 12 are attached to the web of the rib component 4 using the first and second tooling features 9, 13, 16. The first tooling features 9 of the rib component 4 are aligned with the second tooling features 13, 16 of the front and rear tooling components 11, 12. With the front tooling component 11 attached to the rib component 4, the second coordination feature 14 will be coaxial with the front (third) coordination feature 19, assuming that the front coordination feature 19 has been accurately positioned in the rib component 4 with respect to the first tooling features 9.

Next, the front and rear spars 2, 3 having their respective rib posts 5, 6 are fixedly positioned in the desired orientation in a main assembly jig.

The rib 4 having the attached front and rear tooling components 11, 12 is positioned adjacent the front and rear rib posts 5, 6. A tooling component backing plate 20 is positioned on the other side of the rib web. A respective backing plate 20 is used for each of the front and rear tooling components 11, 12. Note that it is generally not possible to install the rib 4 against the spar (rib posts 5, 6) with the backing plates 20 in place, since the tooling components 11, 12 and their respective backing plates 20 form a sandwich arrangement around the rib posts 5, 6. The backing plates 20 have a tooling through hole 21 which is aligned with the through holes of the first and second tooling features 9, 13, 16. A tooling pin, such as a nut and bolt combination 22 (or other removable tooling fastener) is inserted through each of the aligned tooling through holes so as to attach the front and rear tooling components 11, 12, and their respective backing plates 20, to the front and rear ends of the rib component 4. The nut and bolt combinations 22 are not fully tightened at this stage.

The rib 4 is aligned with the front rib post 5 by aligning the first coordination feature 7 with the second coordination feature 14 of the front tooling component 11. When the first and second coordination features 7, 14 are properly aligned a front locating pin 23 can be inserted through the second coordination feature 14, the first coordination feature 7 and the front coordination feature 19 so as to pin the rib component 4 with respect to the front rib post 5.

The rib component 4 is aligned with the rear rib post 6 by aligning the first and second coordination features 8, 17 in the vertical direction. Since the second coordination feature 17 of the rear tooling component 12 is a chordwise elongate slot, tolerances in the assembly can be managed. With the first and second coordination features 8, 17 at the rear aligned a rear locating pin 24 can be inserted through the elongate slot of the second coordination feature 17 and the circular through hole of the first coordination feature 8. Note that the rib component 4 has no coordination feature itself at the rear. The fore-aft position of the rear locating pin 24 in the elongate slot 17 is dependent upon the tolerances which have built up in the assembly.

With the rib component 4 now correctly aligned with respect to both the front rib post 5 and the rear rib post 6, the tooling components 11, 12 are fully tightened using the nut and bolt combinations 22. A drill tool is used to drill rows of fastener holes in the front and rear rib posts 5, 6 and the rib component 4 using the drill bushings 15, 18 in the front and rear tooling components 11, 12. After the drilling operation, the nut and bolt combinations 22, the front and rear tooling components 11, 12 and their respective backing plates 20 are removed. The rows of fastener holes drilled in the front and rear rib posts 5, 6 and in the rib component 4 are cleaned and de-burred. A spacer component may be positioned between the rib web and the tooling components 11, 12 to provide a region for swarf collection during the drilling step, so as to avoid damage to the rib web.

After cleaning, the rib component 4 is once again offered up to the rib posts 5, 6 and fastened thereto using the drilled holes to form rib-spar joints between the rib component 4 and the front and rear rib posts 5, 6.

The tooling components 11, 12, the backing plates 20, the tooling pins 22 and the locating pins 23, 24 can be reused for forming further rib-spar joints on an aircraft wing box assembly line.

FIG. 3 illustrates an alternative rear tooling component 12' for forming a rib-spar joint during assembly of the aircraft wing box 1. Like reference numerals have been used to denote like parts to those described previously. Only the differences between FIGS. 1 and 3 will now be described. A modified rear tooling component 12' has a second coordination feature 17' formed as a slot elongate in the chordwise direction, similar to the slot 17 described previously. However, the slot 17' is formed in a "grow out" loop 12a on the rear edge of the rear tooling component 12'. In all other respects the tooling and formation of the rear rib-spar joint is identical to that described previously.

Forming the slot 17' in the grow out portion 12a of the rear tooling component 12' provides the advantage that the first coordination feature 8' in the rear rib post 6 can be offset in the chordwise direction from the drill bushings 18, and therefore will be offset from the row of fastener holes drilled in the rear rib post 6 during formation of the rib-spar joint.

FIG. 4 illustrates a further alternative tooling and method for forming the rear rib-spar joint during assembly of the aircraft wing box 1. In this alternative example a modified rear tooling component 12" has its second coordination feature formed as an elongate slot 17" at the upper rear corner of the tooling component 12". The rear rib post has also been modified in this example and the modified rear rib post 6" has a lug extension 6a at its upper edge, and the first coordination feature 8" is formed in the lug 6a. The first coordination feature 8" may be accurately positioned by the rear spar supplier relative to the upper surface of the spar 3—should the spar girth be accurately controlled.

The first and second coordination features 8" and 17" need to be aligned during formation of the rear rib-spar joint. For the remaining features, like reference numerals have been used to denote like parts with those described above with reference to FIG. 1 and the steps of forming the rib-spar joint remain as before.

Forming the first coordination feature 8" in the modified rear rib post 6" has the advantage that the first coordination feature 8", which remains in the completed aircraft wing box 1, is yet further removed from the stress concentration regions in the vicinity of the fastener holes formed in the rear rib post 6" during formation of the rear rib-spar joint.

Figure 5:
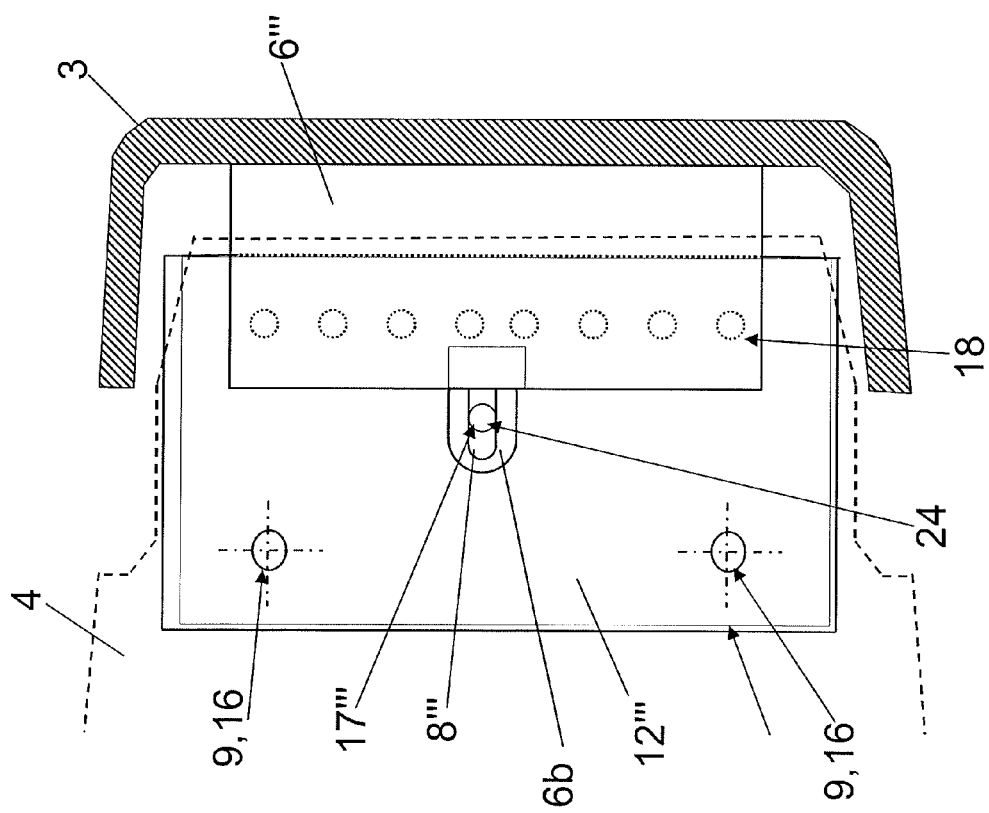
FIG. 5 illustrates a third alternative tooling arrangement for assembling the wing box.

It will be appreciated that the positioning of the first and second coordination features shown in FIG. 4 is purely exemplary and the lug extension may alternatively be positioned extending from the forward edge of the rear rib post. FIG. 5 shows this variant, in which like reference numerals have been used to denote like parts with FIG. 1.

In the alternative example shown in FIG. 5 a modified rear tooling component 12''' has its second coordination feature formed as a circular hole 17''', and a modified rear rib post 6''' has a lug extension 6b at its forward edge. The first coordination feature is formed as a chordwise elongate slot 8''' in the lug 6b.

Figure 6:
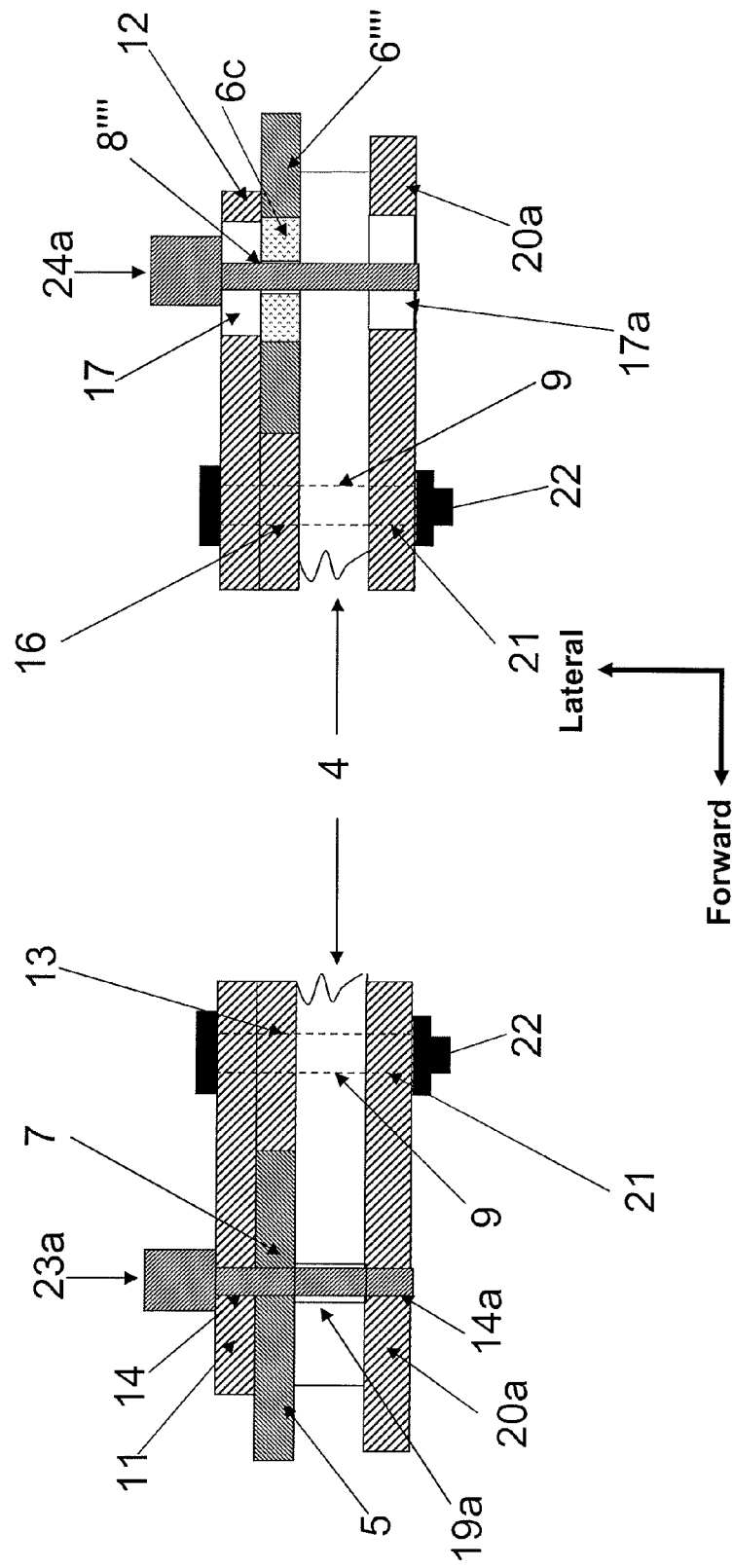
FIG. 6 illustrates a fourth alternative tooling arrangement for assembling the wing box.

Whilst in the embodiment described above with reference to FIG. 2 the locating pins 23 and 24 do not extend into the backing plates 20, it will be appreciated that some improved alignment may be achieved if longer locating pins are used that extend into the backing plates. FIG. 6 illustrates this alternative embodiment, in which like reference numerals have been used to denote like parts with FIG. 2.

As shown in FIG. 6, modified backing plates 20a are used, each having a respective second coordination feature 14a, 17a similar to the second coordination features 14, 17 in the tooling components. The second coordination feature 14a, 17a receive a distal end of modified locating pins 23a, 24a, which are longer than the locating pins 23, 24 shown in FIG. 2.

The rib 4 has a modified front coordination feature 19a formed as a clearance hole that plays no part in the rib setting—all the setting comes from the front tooling component 11 and the first tooling features 9. The clearance hole can be a downsize fastener position that will be opened up to final size, and a fastener installed, once the rib has been set.

A modified rear rib post 6'''' has a lug extension 6c extending from its upper edge. The lug 6c has a circular hole (first coordination feature) 8''''. The elongate slot (second coordination feature) 17 in the rear tooling component 12 is positioned near the top of the tooling component 12, such that when the first and second coordination features 8'''' and 17 are aligned, the rear locating pin 24a can pass through the first and second coordination features 8'''' and 17, over the top of the rib 4 and into the elongate slot 17a in the backing plate 20a. It is important that the longer rear locating pin 24a passes over the top of the rib 4, as it would be undesirable to form a slot in the rib for the pin 24a to pass through.

Although the invention has been described above with reference to one or more preferred embodiments, it will be appreciated that various changes or modifications may be made without departing from the scope of the invention as defined in the appended claims.

The invention claimed is:

1. A method of forming a rib-spar joint during assembly of an aircraft wing, the method comprising:
   providing a spar with a fixedly attached rib post, the rib post having a first coordination feature;
   providing a rib having a web with a first tooling feature;
   providing a tooling component having a second tooling feature for cooperating with the first tooling feature, a second coordination feature for cooperating with the first coordination feature, and a plurality of drill bushings;
   fixedly attaching the tooling component to the rib web by aligning the first and second tooling features;
   aligning the rib with the spar by aligning the first and second coordination features;
   drilling fastener holes in the rib and the rib post off the drill bushings of the tooling component;
   removing the tooling component from the rib web; and
   fastening the rib to the rib post using the fastener holes to form a rib-spar joint.

2. A method according to claim 1, wherein the tooling features are fastener holes, and the step of attaching the tooling component to the rib web is by fastening using the aligned fastener holes.

3. A method according to claim 1, wherein the coordination features are holes for receiving a locating pin, and the alignment step includes passing a locating pin through the aligned coordination features.

4. A method according to claim 1, wherein the drill bushings of the tooling component are arranged linearly.

5. A method according to claim 4, wherein the second coordination feature is offset from the line of drill bushings.

6. A method according to claim 1, wherein the step of aligning the rib with the spar includes bringing opposing surfaces of the rib post and the rib web together.

7. A method according to claim 1, further comprising clamping the rib web and the rib post between the tooling component and a backing component after alignment of the rib with the spar and prior to drilling the fastener holes.

8. A method according to claim 1, wherein the tooling component has two second tooling features, one set to a higher dimensional tolerance than the other.

9. A method according to claim 1, further comprising providing a spacer component between the tooling component and the rib web.

10. A method of assembling an aircraft wing, comprising forming a front rib-spar joint between a front spar and a rib according to the method of claim 1, and forming a rear rib-spar joint between the rib and a rear spar according to the method of claim 1.

11. A method according to claim 10, wherein the rib web has a third coordination feature adjacent the front spar for cooperating with the first and second coordination features, and the rib web has no coordination feature adjacent the rear spar.

12. A method according to claim 11, wherein the cooperating first to third coordination features for forming the front rib-spar joint are each substantially identical substantially circular holes, and the step of aligning the rib with the front spar includes positioning a locating pin in the aligned holes.

13. A method according to claim 1, wherein the first coordination feature on the rear rib post is a substantially circular hole, and the second coordination feature on the rear tooling component is a chord-wise elongate slot, and the step of aligning the rib with the rear spar includes positioning a locating pin in the slot aligned with the hole.

14. A method according to claim 10, further comprising repeating the method of claim 10 to join a plurality of ribs between the front and rear spars with rib-spar joints.

15. A method according to claim 1, wherein the aircraft wing is assembled with the rib longitudinal axis being substantially horizontal.

\* \* \* \* \*